US005257890A

United States Patent [19]

Vickary

[11] Patent Number: 5,257,890

[45] Date of Patent: Nov. 2, 1993

[54] TANK INVERTER

[76] Inventor: Coleman Vickary, R.D. #1, Box 320, Canajoharie, N.Y. 13317

[21] Appl. No.: 823,138

[22] Filed: Jan. 21, 1992

[51] Int. Cl.[5] .......... B65G 65/24

[52] U.S. Cl. .......... 414/420; 414/758

[58] Field of Search .......... 414/420, 421, 422, 425, 414/419, 403, 758

[56] References Cited

U.S. PATENT DOCUMENTS

| | | | |
|---|---|---|---|
| 2,670,864 | 3/1954 | Hought | 214/313 |
| 3,522,893 | 8/1970 | Yokich | 414/420 |
| 3,587,892 | 6/1971 | Vermette | 414/420 |
| 3,623,620 | 11/1971 | Vermette | 414/420 |
| 3,868,033 | 2/1975 | Le Duff | 414/420 X |
| 4,213,727 | 7/1980 | Lightpipe, Jr. | 414/420 |
| 4,797,050 | 1/1989 | Habicht | 414/420 |

FOREIGN PATENT DOCUMENTS

| | | | |
|---|---|---|---|
| 3242165 | 5/1984 | Fed. Rep. of Germany | 414/420 |

OTHER PUBLICATIONS

Pro–Chem Company, Inc. Form CE–420/84 Catalogue Sheet.

*Primary Examiner*—Michael S. Huppert
*Assistant Examiner*—James T. Eller, Jr.
*Attorney, Agent, or Firm*—Schmeiser, Morelle & Watts

[57] ABSTRACT

Apparatus (10) for engaging, raising and rotating tanks/cylinders (48) which store or otherwise contain liquids or gases under pressure. The apparatus consists, basically, in a cradle (30) which is rotationally mounted on a single elevator housing (22). When the tank/cylinder is elevated, the cradle is either simultaneously or subsequently rotated in a plane orthogonal to the front-back axis of the apparatus base assembly (12). Torque and stresses placed on this apparatus are minimized and, in the interest of safety, the tanks/cylinders are rotated and maintained close (in) to the main vertical support at an elevation above the firmament which is the optimum consistent with the operation being performed safely.

7 Claims, 3 Drawing Sheets

TANK INVERTER

BACKGROUND OF THE INVENTION

1. Field Of The Invention

This invention generally relates to a mechanism which provides lifting and tilting for heavy containers, and more particularly to an elevatable cradle assembly which is adapted to completely invert gas cylinders such as propane or butane tanks.

2. Discussion Of Relevant Art

Numerous industries employ large containment vessels such as cryogenic fluids, propane, butane and other substances which, in most cases being volatile, are invariably contained within their containments in a liquid form under considerable pressure. Most of the containments have the general shape of cylinders, although in some cases cylindrical tanks, drums or barrels may be substituted with other shapes tending toward more cubical geometries. Irrespective of the containment type, withdrawal of the liquid contents is, in many cases, incomplete. In order to evacuate the remaining liquid contents or otherwise purge the containments, it has been found to be both expedient and economical to invert the containments, preferably by a complete topsy-turvy maneuver, and thereby drain the remaining liquid contents while the inherent volatility of the liquids serves to increase pressure in the containments, thus helping to expel the remaining liquid content.

Having thus explained the need which is presented to the industry, I will now digress into art which has been developed in the past, as well as that which is available in the industry today, for tilting or otherwise inverting tanks, drums, barrels and the like. For most of this disclosure, I prefer to concentrate on containment characterized by modern pressurized, gas-containing cylinders such as are used for propane or butane storage. It should be understood by the reader, however, that such continual reference is by no means meant to limit the invention as to its utility for inverting containments of practically any geometry or size such as would be reasonably encountered in using the mechanism and apparata hereinafter disclosed.

The U.S. Pat. No. 2,670,864 was issued in 1954 for a COMBINED HOIST AND POURING STAND FOR CONTAINERS. The patentee engages a container by envelopment within a cupping framework. Thereafter it is hoisted by lifting the framework between two vertical uprights of a footed stand using a conventional winch. The footed stand, or podium as I choose to term such a mechanism, is asymmetrical, having parallel elongate members extending toward what the patentee terms the front of his apparatus. Once the cupping frame is sufficiently elevated, the container which has been hoisted therein is tilted forward in a portion of the cupping frame that is pivotally mounted to the major elevational frame work. A distinct advantage of this apparatus is that the container or drum being tilted is caused to pivot or rotate about an axis passing through its nominal (when full) center of gravity. Also apparent, however, are two very distinct disadvantages: (1) because the remaining elevational framework and podium structure prevent complete 180° inversion of the containment, the receiving container (if there is one) cannot be placed directly beneath the container being emptied—it must be placed to the fore of the podium; and, (2) because of the inability to rotate 180°, along with the constraint offered by the cylindrical type elevational framework, the patented apparatus remains but a pouring stand and will not serve the industry for the specific tank inversion maneuvers which I feel are truly demanded.

Throughout the art there have been myriad disclosures of tilting apparata that range from garbage can tilters to barrel inverters, but provide only a modicum of functionality that I have determined must be developed for the industry. In a more modern vein, there has been effort expended to provide gas tank inversion apparata. The Pro-Chem Company of Middlesex, N.J. catalogues a "Model CE-420 Tank Inverter" which is made to tilt and "invert" LP-GAS cylinders in order to enhance either product evacuation or facilitate repair or maintenance. Utilizing one-person operation, it consists mainly in a base assembly comprising a podium (such as discussed above) having thereon two vertical, rigid supports which pivotally engage a cradle of size sufficient to handle the referenced LP-GAS cylinders (which may range up to 420 lbs). The CE-420 is, however, a ponderous mechanism acquired at considerable investment and which tilts or "inverts" a cylinder in what I feel is a rather bizarre fashion. The cylinder is engaged in the cradle at the front of the podium and, while strapped to the cradle, is inverted, not by a simple pivotation, but by a lifting up and "over-the-shoulder" maneuver which actually moves the cylinder center of gravity in an arcuate motion beginning at the front of the podium and terminating, in the air, proximate the rear of the podium. That such a maneuver exacts a near 180° inversion is not to be contested; however, the heavy duty framework, motive power, harness strengths and inherently unsafe maneuvering of the cylinder certainly demands questioning. What is particularly disconcerting is that several devices of such nature are on the market today; —they move the containment off the firmament and either cantilever it for subsequent rotation fore-aft or they simply, like the CE-420, arcuately motivate it over-the-shoulder in a single topsy-turvy maneuver.

SUMMARY OF THE INVENTION

I have conceived and developed a truly unique apparatus that provides all of the advantages sought by the prior art while almost totally eliminating the aforesaid disadvantages. The instant invention provides to the gas cylinder/tank industry what the hopper car provided to the railroad—an extremely simple, efficient, safe and positive means for totally evacuating the contents of the respective containments.

My invention consists in a base assembly, an elevator assembly, a cradle assembly and a few cradle adjunct mechanisms which are economically combined in a predominantly metal structural framework which is used to secure a container firmly while enveloping, by the cradle, a particular containment's center of gravity (CG), lifting or elevating the containment above the firmament and, either simultaneously with or subsequently thereafter such elevating, rotating the cradle about the CG of its contents to a complete and absolute 180° position. As may be readily inferred by the reader, that rotation takes place in a plane such is orthogonal to the fore-aft axis of the base assembly and not, as in the relevant art, coplanar with the fore-aft axis. This is an extremely important distinction; as I have noted in all of my searches of the trade journals and catalogue literature, no such apparatus of this type exists. As given briefly above, the instant invention operates somewhat differently in its operational kinematics. This not only leads to a simplicity of design, but a design of considerable economy in that, since much of the tilting effort is had about an axis passing through the CG of the containment, very little effort need be expended in performing the pivotation (or rotational) maneuver. Another notable distinction exists in the fact that the elevating mechanism of my invention is but a single column; whereas, almost all of the preceding art utilizes two or more vertical supports, posts or beams. Because of rotation in a plane orthogonal to the fore-aft axis, minimum torque is applied through the supporting post to the foreward extension of the podium (the base means) of the base assembly and elevator assembly. There is simply very little mass (comparatively speaking) that is cantilevered outward of the vertical support column because the rotational plane is "tucked in" closely to that vertical column and turns about a shaft which is journaled in the elevator assembly. The more distinctive features, as well as the minutiae, of the invention will be given in the Detailed Description of the Preferred Embodiment after a brief reference to the illustrative drawings contained herein.

DETAILED DESCRIPTION OF THE PREFERRED EMBODIMENT

Before detailing the most salient points of my invention, I feel it prudent to set forth for the reader a nomenclature that I choose for description as well as brief definitions therefor. The invention 10 consists essentially in a base assembly 12, an elevator assembly 20, a cradle assembly 30 and various adjunct mechanisms which are associated primarily with the cradle assembly, although not limited exclusively thereto.

Figure 1:
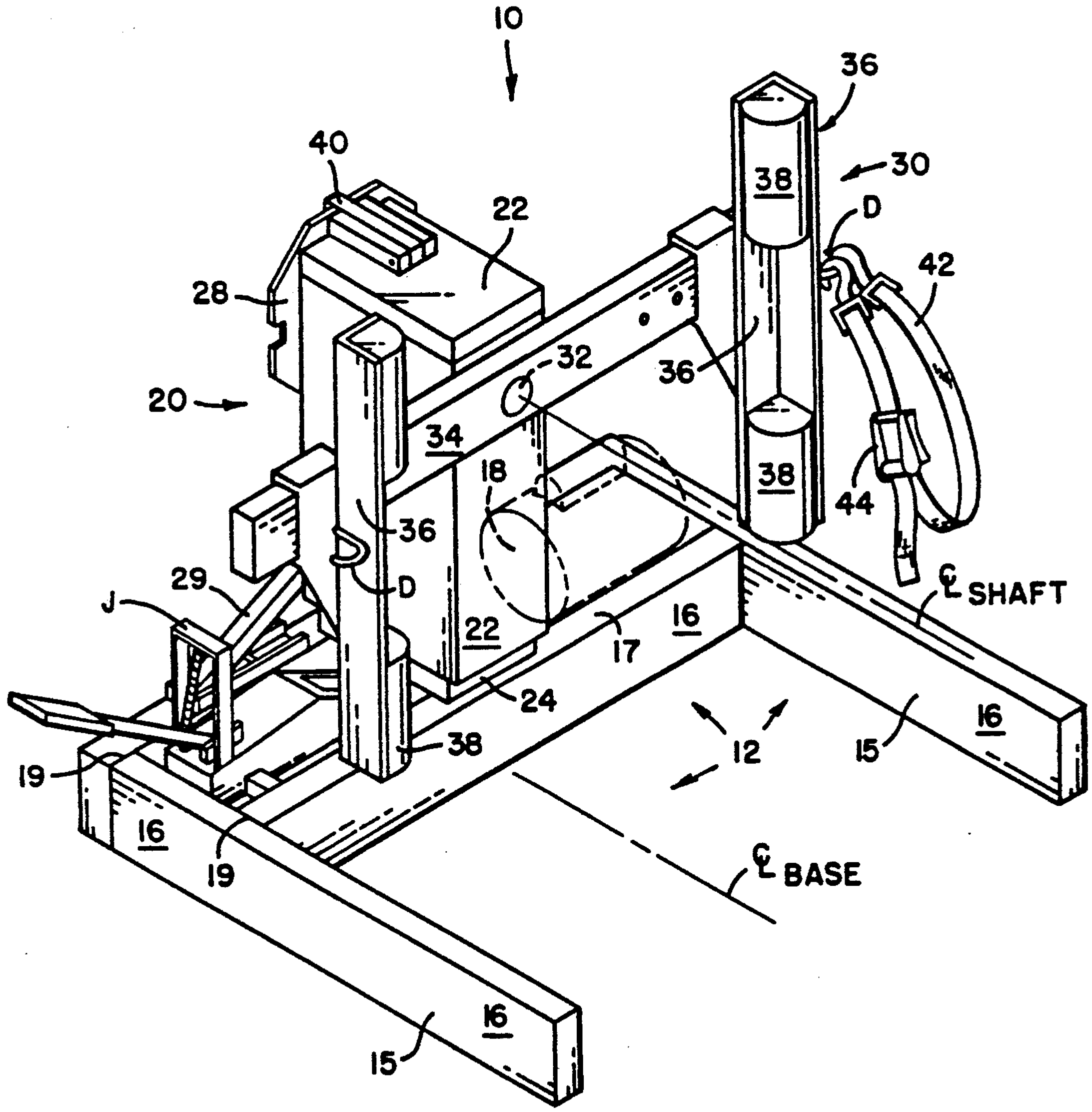
FIG. 1 is an isometric front oblique view of the invention in its lowered mode.

FIG. 1 shows of the base assembly 12: a base means consisting in a podium 16 comprising a pair of elongate, parallel equal-length beams and a 90° transversal connector platform for joining the beam pair at mutual ends of the individual beams at a point proximate the rear of the podium; and an elevating mechanism 18 which is an hydraulic or electric and/or mechanical motivator including, rack and pinion or pawl and ratchet which are mounted to the podium and exert an upward translational force to a vertically moveable unit, case, housing or sleeve.

The elevator assembly 20 is the combined mechanism which both secures the cradle assembly and moves it vertically, while allowing the cradle assembly to rotate. It consists in: a sleeve housing 22 which envelops a fixed support column 24 on which it rises and descends. This housing secures rotating shaft 32 rotational and indexing 28 mechanisms; a fixed support column 24, as previously mentioned, is a vertical, rigid and fixed column which is mounted to the base means and is slidingly enveloped by the sleeve housing 22; rotational and indexing mechanisms for actuation and fixation of the rotating shaft 32 also includes the indexing means 28 which is a plate centrally and perpendicularly mounted to the rear end of the rotating shaft 32; and lock bar 29, a bar hingedly attached to the sleeve housing which drops to several positions near the vertical, including a vertical position against the fixed support column, as the housing is raised and is adapted to receive a locking pin therethrough which completes a secure coupling between the housing-attached bar and the fixed straight support column, thus securing the housing in some raised position. The lock bar 29 is more properly termed an adjunctive mechanism and variations for its securement are discussed hereinafter.

The cradle assembly 30 serves as a holder for the container to be tilted or inverted. The parts of the assembly include: a rotating shaft 32 which is orthogonally mounted or journaled proximate the top of the sleeve housing 22 so that the shaft allows the cradle assembly to pivot about a single point in a plane; a cradle beam 34 is orthogonally fixed to the forward end of the rotating shaft 32; while jaws or cross arms 36 serve as a pair of opposing, elongate 90° beam-mounted units that are jawlike and are translatable along the beam; and contact pads 38 which comprise four (or more) resilient fixed pads that are opposingly mounted, one at each end of each two jaw or cross arm 36 units.

Finally, adjunct mechanisms are employed and include primarily cradle equipment consisting of, for example, jaw or cross arm-mounted "C" or "D" rings, strap and cinch equipment and various safety pins for immobilizing jaws with respect to the beam, index plate with respect to the housing and the housing safety lock lever with respect to the fixed support column. Alternatively, a track with locking lugs on the rearmost portion of the transversal connector platform are used oftentimes to secure the housing safety lock bar 29 when it is not in the vertical, against-the-support posture.

With an understanding of the more salient and operational elements of the invention, the reader shall more fully appreciate the following detailed description, having reference to the drawings. Referring particularly to FIG. 1, there is shown in isometric front oblique illustration the invention 10 in its lowered mode. Of prominence in the FIG. 1 depiction is the base assembly 12 consisting in a base means. Within the base means, a podium 16 is comprised of a pair of elongate parallel, equal length beams 15 and a 90° transversal (across the parallel) connector platform 17. As can be seen, the platform 17 joins the beam pair at mutual rear ends 19 of the beams 15, thus forming the podium 16 ensemble. An elevating or jacking mechanism J comprises an hydraulic jack, which I prefer in this embodiment. It should be understood, however, that other means may be used for effecting an upwardly directed force which is to act on sleeve housing 22. Matters of this nature, however, are well known in the art and to spend additional time describing wherein a housing 22, emulative of a sleeve, may be caused or forced to rise on a vertical column or post 2 would belabor the brevity and simplicity of this disclosure. Suffice it to say that any mechanism, such as the instant jack J, hydraulic or electric motor means and/or mechanical means which include such common mechanisms as rack and pinion or pawl and ratchet, could also be made to provide a suitable elevating mechanism 18 as shown internal (in phantom) of the sleeve housing 22.

Figure 2:
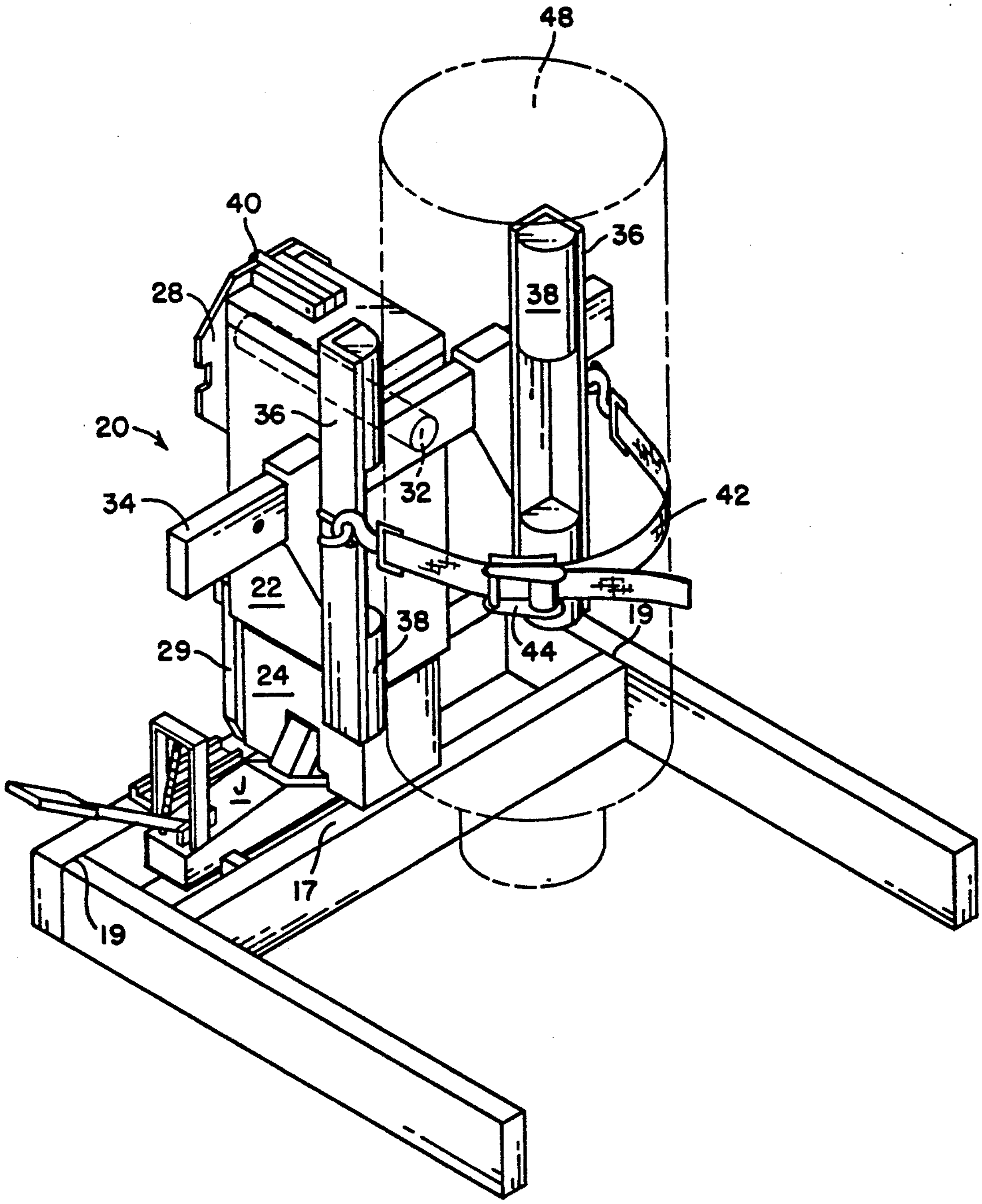
FIG. 2 is an isometric front oblique view of the invention in its elevated mode.
Figure 3:
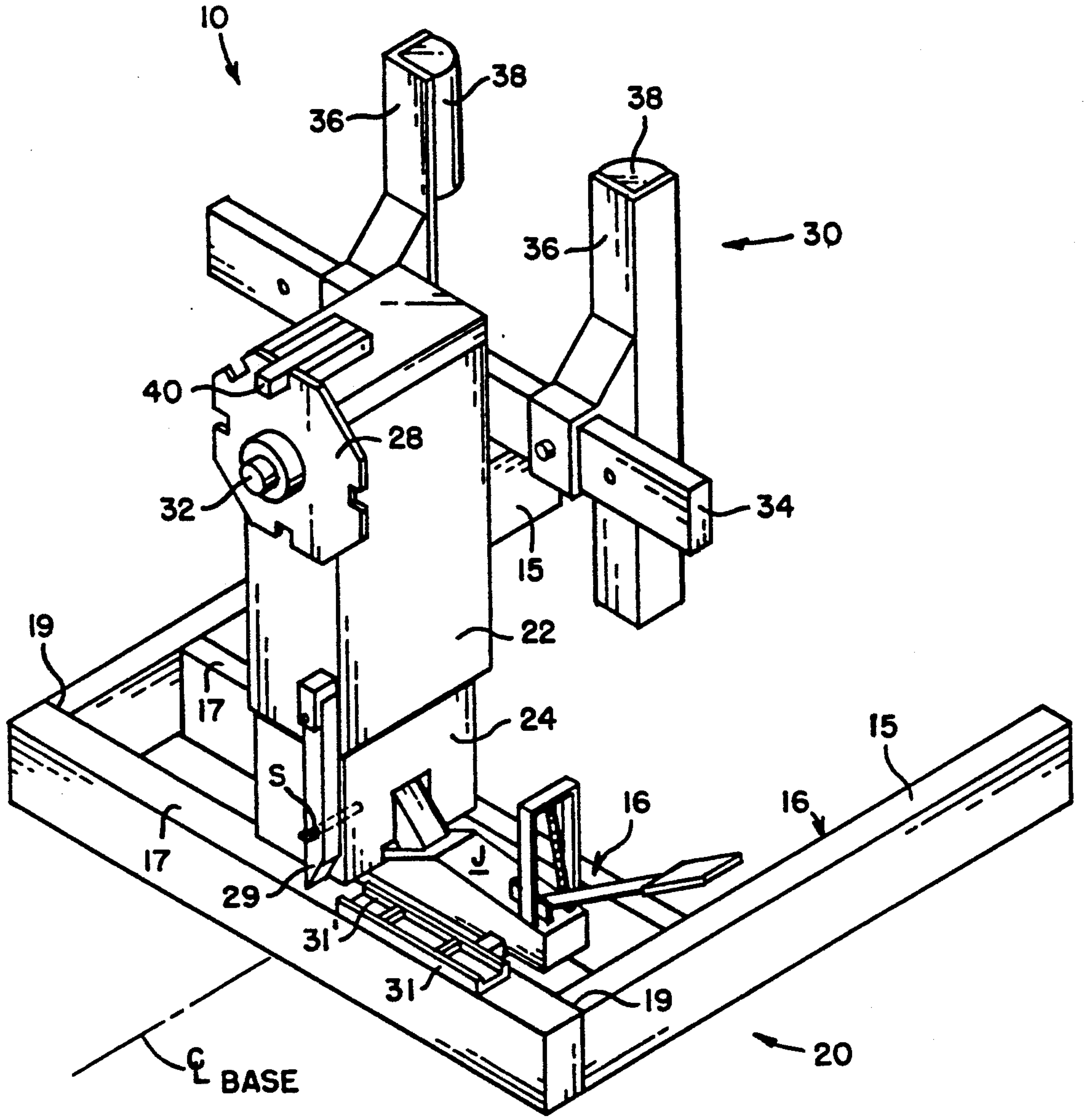
FIG. 3 is an isometric rear oblique view of the invention in its elevated mode.

The FIG. 2 representation, which is an isometric front oblique view of the invention in its elevated mode, serves to illustrate the salient portions of the elevator assembly 20. It may be seen that the fixed support column 24, a vertical, rigid and fixed column is mounted to the base means and is slidingly enveloped by the sleeve housing 22 which rises vertically thereon. The sleeve housing 22, enveloping the fixed support column 24 on which it rises and descends, is the unit which contains a rotating shaft 32 that is associated with the cradle assembly 30. Although not shown herein, the rotational mechanism is partially disclosed by a phantom depiction of the rotating shaft 32, which comprises the principal element thereof. Other elements such as bearings and seals are omitted for the sake of clarity. Also absent from the FIG. 2 depiction, but present in FIG. 3 is an indexing means comprising an indexing plate 28 which is centrally and perpendicularly mounted to the rear end of rotating shaft 32. Remaining and adjunct elements of the elevator assembly consist in a lock bar 29 which will be more adequately discussed along with the exposition of FIG. 3.

Turning now to FIG. 3, there is disclosed in isometric rear oblique representation, the invention 10, in elevated mode. Lock bar 29 is seen depending hingedly from the sleeve housing 22. As the housing rises and the lock bar 29 is allowed to drop through several positions approaching the vertical, it may be set into a locking track 31 containing several locking lugs 31'. In the vertical position, the lock bar 29 may be safely secured to the fixed support column 24 by a safety pin S. Prominent in all three figures, but discussed in greater detail with FIG. 3 is the cradle assembly 30. This assembly serves as the holding apparatus for the container 48 which is to be tilted or inverted. The cradle assembly is similar to a yoke which engages an object of practically any shape. From the FIG. 3 view, one notices immediately an indexing plate 28 (with its several notches corresponding to 0°, 45°, 90° and 180° indexing) of the cradle assembly which reveals the angle at which the tank or cylinder 48 is tilted. The rear portion of rotating shaft 32 is exposed in this view disclosing its central and perpendicular mounting to the index plate 28. Perpendicularly mounted to the forward end of the rotating shaft is cradle beam 34. It may be seen that both the indexing plate and the beam 34 are capable of rotation about the rotating shaft 32 axis in coplanar relationship. Slidably mounted on and perpendicular to the beam 34 is a pair of opposing, elongate units termed jaws or cross arms 36. It may be readily seen that these are translatable along the beam and are fixed therealong by the insertion of pin or bolting mechanisms which utilize the series of holes shown at the rear of the beam 34. Final to the cradle proper are resilient, fixed pads, contact pads 38, which are opposingly mounted, one at each end of each two jaw units 36. Those of ordinary skill will recognize the contact pads as being necessary for the securement to the cradle of any of the described containments in a manner that will not damage or harm such containments. Final to the FIG. 3 disclosure, the index (detent) bar 40 is seen hingedly mounted to the top of the sleeve housing 22. It is biased so that it will recess into any of the index slots that were previously mentioned, thereby securing the rotating shaft 32 and the entire cradle assembly 30 in a fixed position. Other minutiae and detail will be readily recognized by the routineer.

Final to this disclosure is a brief description of the method and apparatus employed for effecting the desired tank/cylinder maneuvers using the instant apparatus. The tank to be inverted 48 is set in the front (foreportion) of the apparatus as disclosed in FIG. 2 while the jaws/crossarms 36 are positioned equidistant from the rotating shaft center 32. The tank is pressed into the contact pads 38 and the sleeve housing 22 is adjusted so that the rotational axis of the rotating shaft 32 will pass through the nominal CG of the tank. The tank (or pair of tanks) are now cinched into the cradle assembly 30 by use of high strength nylon webbings that are coupled to the D rings located at the forward faces of the jaws/crossarms 36. Any number of these D rings or similar apparatus may be used. The strap 42 may be of a conventional nylon webbed type or whatever may be safely used with the particular operation and product to which the strap is exposed. The strap 42 is then cinched around the tank(s) 48 and shanked using conventionally available apparatus such as over-center locking shanks/cinches 44. Depending upon the length of the particular containments being inverted, more than one set of D rings and straps 42 may be used. Similarly, cinchable webbing (not shown) may also be affixed to the jaws/crossarms 36 for the purposes of securing one or more containments to the cradle assembly.

Those now familiar with the instant invention may conceive of several similar but different mechanisms which function as those disclosed or, additionally, choose to use varying means of motivation, perhaps even in the rotating shaft mechanism, thereby avoiding perhaps the use of the indexing plate and index bar. Such is certainly conceivable and may be readily accomplished without departing from the intent nor the spirit of the hereinafter appended claims.

What is claimed is:

1. An elevatable and simultaneously rotatable cradle assembly for inverting heavy containers comprising:

a podium having a front and a back and which includes two parallel elongate beams that are joined by an orthogonal base platform at the back of said podium, and lug means for engagement with a pivotal drop bar suspended above the podium;

an elevator assembly comprising a single vertical support fixedly ascending from the center of said platform, a sleeve housing with a closed top movably enveloping the support and an hydraulic jacking means for directing an upward projecting force to the sleeve housing in order to effect vertical movement of the sleeve housing on the support, and a pivotal drop bar hingedly connected to the sleeve housing and adapted for engagement with said lug means;

a pivotation mechanism comprising a rotatable shaft journaled in and proximate the sleeve housing top, the shaft journaled to align its axis of rotation axially parallel to a center line through the front and the back of the podium, said shaft mounted orthogonally with respect to the support;

an index plate centrally and perpendicularly fixed to the back end of the shaft, the plate bearing at least two peripheral notches adapted to receive therein a lock means; and a cradle assembly attached to the front end of the shaft, said cradle assembly further comprising an elongate beam fixedly secured and perpendicular to the front end of the shaft, at least two cross beams slidably mounted to the elongate beam with means for fixedly securing the cross beams therealong and at least one D ring associated with each said cross beam for securing straps thereto, whereby an object being secured in said cradle assembly and elevated from its firmament there-with acquires rotatability in a plane orthogonal to said center line passing through the front and back of the podium.

2. A tilting and inverting apparatus for elevating an object and rotating it about its center of gravity comprising;

a base means having a defined front and a back, including a platform fixed proximate the back;

an elevator means comprising a vertical support and shrouded by a moveable sleeve, the support fixedly secured to the center of the platform and the moveable sleeve having a defined top with a rotatable shaft journaled therein which is aligned parallel to a centerline which passes through the base means central to said front and back, said elevator means actuable by a mechanical motive means;

indexible rotation means comprising said shaft which further bears, on the back thereof, a fixed index means; and a cradle means, for securely holding a container, said cradle means comprising an elongate beam fixedly secured at its center and perpendicular to the front of the shaft, at least a pair of crossarms slidably mounted on the beam orthogonally thereto, said crossarms bearing on each a securing means for attaching straps thereto, whereby a centralized securement of the object in the cradle means and elevation thereof by the elevator means allows the object sufficient ground clearance to enable its pivotal inversion about its center of gravity in a plane orthogonal to the centerline axis.

3. The apparatus of claim 2 wherein said motive means further comprises a jacking means.

4. The apparatus of claim 3 wherein said index means comprises a plate which has a plurality of fixed peripheral notches therein and is centrally and perpendicularly fixed to the back end of the shaft, said index means further comprising a lock bar means disposed and biased so as to normally fit into one of said plurality of notches, the lock bar secured fixedly at some point thereof to the sleeve.

5. The apparatus of claim 2 further comprising immobilization means for fixedly securing the slideably mounted pair of crossarms along the beam.

6. The apparatus of claim 5 further comprising securing means for the attachment of said straps to the crossarms, said securing means attached individually to a crossarm and comprising a ring feature.

7. An improvement in tilting apparatus which allows complete inversion of a container while pivoting about its center of gravity in a rotational plane that is perpendicular to a footing pair of the apparatus and orthogonal to a defined fore-aft centerline, the improvement comprising:

a base having a platform and a pair of set-apart parallel feet extending horizontally outward, forward of and orthogonally therefrom;

a vertical support column enshrouded by a movable sleeve, the column projecting upward of the platform center and the sleeve further containing therein and orthogonally projecting therethrough a rotatable shaft, the shaft rotating on an axis coparallel with the extending feet, said shaft further comprising, at an end facing aft, an indexing means for securing said shaft in one of a plurality of rotational positions:

motivation means attached to the platform for urging the sleeve upward and controlling a subsequent descent; and a cradle comprising a framework disposed essentially in a plane orthogonal to the shaft and for securing therein a container, said cradle framework centrally and orthongonally fixed to the rotatable shaft over the feet, said cradle framework further comprising an elongate beam fixedly secured at its center and perpendicular to the front end of the shaft, at least a pair of crossarms slidably mounted on the beam orthogonally thereto, said crossarms bearing on each a securing means for attaching straps thereto, whereby container(s) secured in the cradle, when elevated by the motivation means, are freely rotatable about a common CG in the cradle framework plane that is over and perpendicular to the feet, and when rotated may be temporarily secured by said indexing means in one of a plurality of rotational positions.

* * * * *